(12) United States Patent
Lauziere et al.

(10) Patent No.: US 10,486,616 B2
(45) Date of Patent: Nov. 26, 2019

(54) SELF-DETACHING SUPPORT FRAME SYSTEM FOR AN IMPLEMENT AND METHOD FOR USING THE SAME

(71) Applicant: Soucy International Inc., Drummondville, Quebec (CA)

(72) Inventors: Benoit Lauziere, Pierreville (CA); Jeremie Aubin-Marchand, St-Hugues (CA); Karen Provencher, Drummondville (CA); Michael Bergeron, Drummondville (CA); Tommy Roy, St-Lucien (CA); Normand Roy, St-Hugues (CA)

(73) Assignee: SOUCY INTERNATIONAL INC., Drummondville (CA)

(*) Notice: Subject to any disclaimer, the term of this patent is extended or adjusted under 35 U.S.C. 154(b) by 0 days.

(21) Appl. No.: 15/088,925

(22) Filed: Apr. 1, 2016

(65) Prior Publication Data
US 2016/0289915 A1    Oct. 6, 2016

Related U.S. Application Data

(60) Provisional application No. 62/141,457, filed on Apr. 1, 2015.

(51) Int. Cl.
| | |
|---|---|
| *B60R 11/06* | (2006.01) |
| *E01H 5/06* | (2006.01) |
| *E02F 3/627* | (2006.01) |
| *E02F 3/76* | (2006.01) |

(52) U.S. Cl.
CPC .............. *B60R 11/06* (2013.01); *E01H 5/061* (2013.01); *E02F 3/627* (2013.01); *E02F 3/7609* (2013.01)

(58) Field of Classification Search
CPC .......... B60R 11/06; E01H 5/061; E02F 3/627
USPC .......... 172/810, 811, 817; 37/231, 235, 236
See application file for complete search history.

(56) References Cited

U.S. PATENT DOCUMENTS

| | | | | |
|---|---|---|---|---|
| 5,615,745 A * | 4/1997 | Cross | ........................ | E01H 5/06 172/776 |
| 6,276,075 B1 * | 8/2001 | Kost | ........................ | E01H 5/06 172/274 |
| 6,502,334 B1 * | 1/2003 | Davies | ...................... | E01H 5/06 172/811 |
| 6,843,002 B1 * | 1/2005 | Moffitt | ................... | E02F 3/7613 172/272 |
| 6,957,505 B1 * | 10/2005 | Moffitt | ....................... | E01H 5/06 172/272 |
| 8,381,422 B2 * | 2/2013 | Hill | ....................... | E02F 3/7627 172/817 |
| 8,656,615 B1 * | 2/2014 | Fournier | .................. | E01H 5/061 172/272 |
| 8,763,280 B1 * | 7/2014 | Fournier | ................... | E01H 5/06 172/272 |
| 9,145,096 B2 * | 9/2015 | Werthauser | ............. | B60R 11/00 |
| 9,145,915 B2 * | 9/2015 | Coulombe | .............. | E01H 5/063 |

(Continued)

*Primary Examiner* — Matthew Troutman
(74) *Attorney, Agent, or Firm* — BCF LLP

(57) ABSTRACT

A self-detaching support frame system for an implement designed to self-detach from a vehicle by actuation of a release handle located within arm reach of the driver is disclosed. The self-detaching support frame system for an implement allow the user to at least partially, preferably entirely, disengages the support frame assembly by activating a control, preferably a single control such as a handle located near the vehicle steering.

15 Claims, 10 Drawing Sheets

(56) References Cited

U.S. PATENT DOCUMENTS

| | | | |
|---|---|---|---|
| 2001/0047600 A1* | 12/2001 | Quenzi | E01H 5/06 37/270 |
| 2007/0084089 A1* | 4/2007 | Shoemaker | E01H 5/06 37/231 |
| 2007/0101620 A1 | 5/2007 | Roy | |
| 2007/0187118 A1* | 8/2007 | Belanger | A01B 59/064 172/1 |
| 2008/0072464 A1* | 3/2008 | Kost | E01H 5/06 37/231 |
| 2009/0031592 A1* | 2/2009 | LeBlond | E01H 5/066 37/231 |
| 2010/0101119 A1* | 4/2010 | Roberts | E01H 5/06 37/231 |
| 2010/0175281 A1* | 7/2010 | LeBlond | E01H 5/066 37/231 |
| 2012/0117833 A1* | 5/2012 | Hill | E02F 3/7627 37/231 |
| 2012/0187263 A1* | 7/2012 | Coulombe | E01H 5/063 248/205.1 |
| 2013/0212913 A1* | 8/2013 | Despres | E01H 5/06 37/231 |
| 2016/0138233 A1* | 5/2016 | Barker | E01H 5/061 37/231 |
| 2017/0292245 A1* | 10/2017 | Jewell | E02F 3/844 |

\* cited by examiner

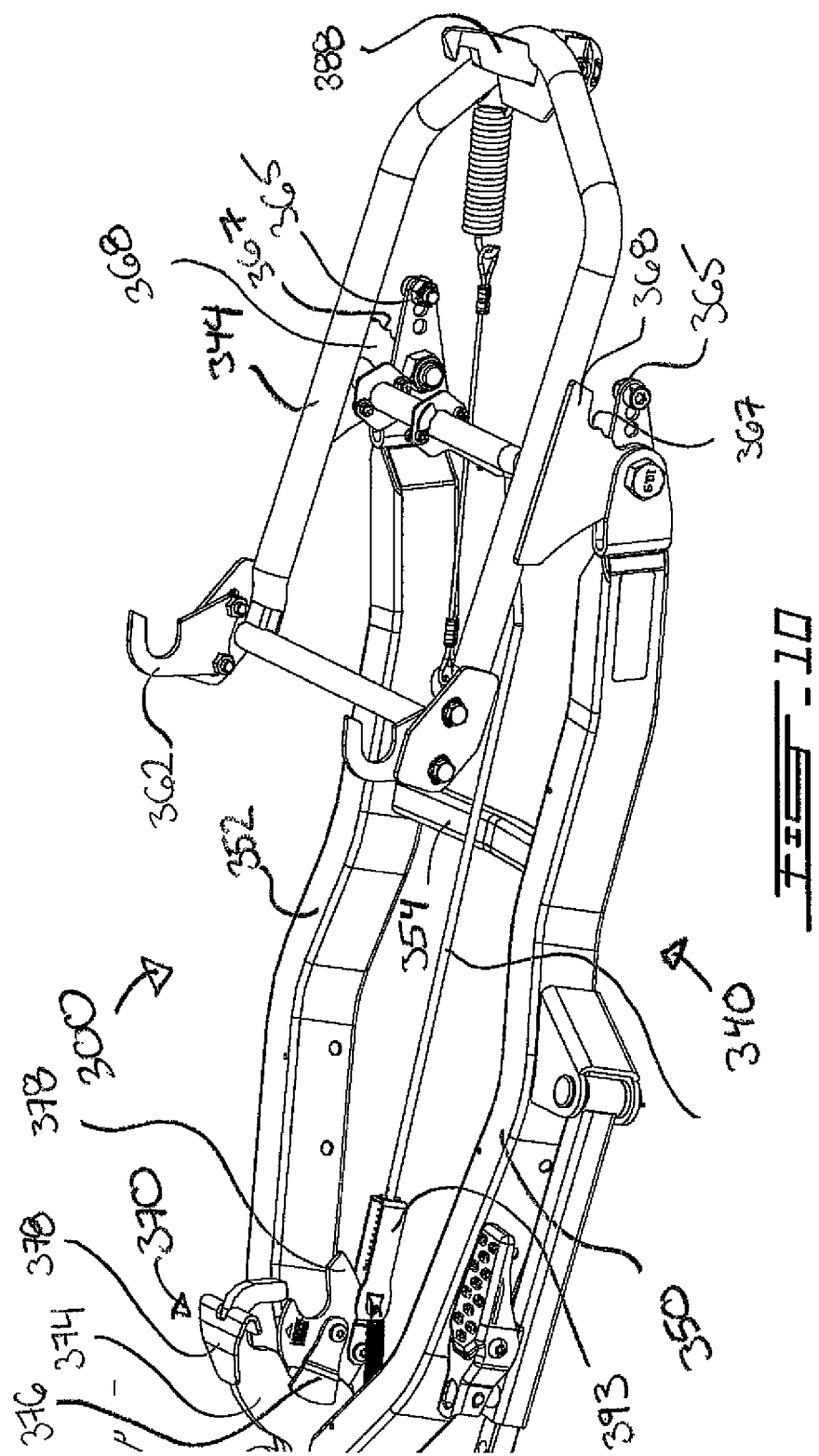

SELF-DETACHING SUPPORT FRAME SYSTEM FOR AN IMPLEMENT AND METHOD FOR USING THE SAME

CROSS-REFERENCE TO RELATED APPLICATIONS

The present patent application claims the benefits of priority of U.S. Patent Application No. 62/141,457, entitled "Self-detaching support frame system for an implement and method for using the same", and filed at the US Patent Office on Apr. 1, 2015, the content of which is incorporated herein by reference.

FIELD OF THE INVENTION

The present invention generally relates to frames and frame assemblies for supporting implements on vehicles and more particularly relates to frames and frame assemblies for supporting implements on small vehicles such as, but not limited to, all-terrain vehicles ("ATV" or "ATVs") and utility-terrain vehicle ("UTV" or "UTVs").

BACKGROUND OF THE INVENTION

Since a couple of years, the All-terrain vehicles ("ATV" or "ATVs"), utility-terrain vehicle ("UTV" or "UTVs") or other recreational off highway vehicles ("ROV") (hereinafter, ATV should be understood to refer as comprising ATV, UTV, ROV and other similar vehicles) market has been growing steadily. Moreover, ATV users have been using their vehicles for new tasks such as snow removal, load transport, etc. To help ATV users make the fullest use of their vehicles, numerous accessories have been put on the market. ATV and other similar vehicles are often equipped with implements such as plows to allow the vehicles to displace snow, dirt, soil, gravel, etc. Such implements are typically removably mounted to the vehicles via appropriate supporting frames or supporting frame assemblies.

However, in order for the ATV user to use an accessory to its full capacity, the accessory must be easy to use and more importantly, easy to install. In the field of support frame assemblies for snow plows and other front-mounted implements, this is even more important since these assemblies are generally relatively heavy and thus difficult to manipulate and install.

Support frame assemblies currently on the market are not easy and/or are time consuming to install. In the vast majority of cases, when the user is alone, he or she (hereinafter, for the sake of simplicity, only the masculine form will be used) must use brute force to install the frame assembly on his ATV. This comes from the fact that all the weight of the plow assembly rests on the ground. Thus, the user must overcome the friction force between the ground and the plow. Moreover, since snow plows are generally made of metal, they can be relatively heavy and the friction force between the ground and the plow can be relatively large.

Thus, in general, most frame assemblies currently on the market are more easily installed when two or more individuals are present.

As a result, in current frame assemblies, the majority of the systems on the market offer the possibility of a quick attach, which allows the user minimal handling to mount the plow system on the ATV. Unfortunately, these systems require the user to get out of the vehicle to detach the plow system from the ATV. Some plow systems comprise quick release mechanisms which allow removing the plow system from the vehicle without undue labor. However, even these quick release mechanisms require the user to get out of the vehicle. There are even some plow systems that are not equipped with quick release mechanisms and imply that the users should lie down under the vehicle to install or detach the plow push frame from the ATV.

In view of the foregoing, there is indeed a need for a new and improved support frame assembly for a plow or other implement which mitigates at least some of the shortcoming of prior art support frame assemblies.

SUMMARY OF THE INVENTION

The shortcomings of the prior art are generally mitigated by providing a self-detaching support frame system for an assembly.

Since the self-detaching support frame system for an implement in accordance with the present invention can be used with implements and accessories other than plows, hereinafter, the term "plow" shall be construed broadly and shall therefore relate to any front-mounted accessories such as plow, blade and other similarly mounted implements.

The self-detaching support frame system for an implement is designed to fill a need on the market for mechanical self-detach system that can at least partially, preferably totally disconnect the push frame from the vehicle by pulling on a release handle while remaining seated on the vehicle.

Hence, the self-detaching support frame system for an implement allows the user to at least partially, preferably entirely, disengage the support frame assembly by activating a control, preferably a single control such as a handle located near the vehicle steering. Understandably, the handle could be located at various locations on the vehicle as long as the user may access the handle without requiring him to go off the vehicle.

According to one aspect of the present invention, once disengaged, the vehicle is preferably ready to drive without the plow system and without the user having to get off the vehicle. This system has a pull cable with a handle located near the ATV steering, which is connected to the mount plate latching system.

According to one aspect of the present invention, the self-detaching support frame system for an assembly does not require the user to get off the vehicle or lay down on the floor to disengage the plow system.

According to one aspect of the invention, the self-detaching support frame system for an assembly may additionally release the winch hook automatically without further user manipulation.

According to one aspect of the present invention, the self-detaching support frame system for an assembly preferably requires no engine or electric system, only mechanical components to detach the plow system. The absence of an engine or electric actuated system generally implies a low-cost mechanism.

According to one aspect of the present invention, a method for removing a support frame system for an assembly is disclosed. The method comprises the step of:
 a. pulling a handle on the vehicle to activate the mechanism.

According to one aspect of the present invention, the trigger handle is preferably connected to the activation cable. This cable is then connected to a mount plate that is fastened under the vehicle. Pulling on the trigger handle rotates the lock system and releases the hook of the latching system. The latching mechanism is held to the mount plate by the hook and by two brackets (parts are attached on the ATV). By releasing the hook, the latching system falls on the ground by gravity, then releasing the front brackets in the same movement. The system is now completely disengaged. Once disengaged, the tube or lever arm retained under the vehicle moves. As such, upon falling of the latch system on the ground, a lever arm is released thus disengaging a rod operatively connected to a rotated lock plate previously engaging a winch hook. By this movement, the rod pulls the pivot link and ejects the winch hook. As a result, the winch hook is now completely disengaged. The system is totally free to be moved and the vehicle ready to ride without the plow system.

Hence, a self-detaching support frame system for an assembly, in accordance with the principles of the present invention, generally extends longitudinally and generally comprises, at its rear end, a rear attachment mechanism for removably mounting the rear end of the support frame to the underside of the vehicle, and at its front end, an implement attachment assembly for supporting the implement.

The rear attachment mechanism typically allows the support frame to pivot with respect to the vehicle, thereby allowing the support frame to be raised and lowered as needed, typically by the winch of the vehicle. In typical though non-limitative embodiments of the support frame, the rear attachment mechanism is a latching mechanism that comprises one or more latches.

In typical though non-limitative embodiments of a support frame, the support frame is configured to support a plow.

The support frame assembly in accordance with the principles of the present invention also generally simplifies the installation and removal of the support frame assembly to and from a vehicle.

According to one aspect of the present invention, a self-detaching support frame for an implement for a vehicle is disclosed. The support frame comprises a first portion, a second portion and a lever arm. The first portion comprises a first end adapted to receive an implement and a second end adapted to receive a lifting system. The second portion being pivotally mounted to the first portion and comprises a first end comprising a first securing member adapted to engage with a retaining member mounted to the vehicle and a second end comprising a second securing member adapted to engage with a receiving member mounted to the vehicle. The lever arm is pivotally mounted to the second portion, the lever arm being adapted to engage the lifting system. The disengagement of the retaining member from the first securing member allows the second portion to move downwardly, the downward movement allowing the lever arm to move and to release the lifting system.

According to one aspect of the present invention, the second portion has a D-shape made from tubular members and comprises side arms mounted to the tubular members adapted to be pivotally mounted to the first portion.

According to one aspect of the present invention the axis of rotation of the lever arm with regards to the second portion and the axis of rotation of the second portion with regards to the first portion are substantially parallel.

According to one aspect of the present invention the axis of rotation of the second portion with regards to the first portion is substantially perpendicular to the length of the support frame. The lever arm may be mounted between the end of the second portion and the opposite end of the first portion.

According to one aspect of the present invention the first end is a latch hook adapted to be engaged by the retaining member. The receiving member may be a rod substantially perpendicular to the length of the support frame. The lever arm may be mechanically connected to the attachment system.

According to one aspect of the present invention the mechanical connection is a rod.

According to one aspect of the present invention, the attachment system comprises a hook mounted to the first portion, a supporting member mounted to the hook, and a lock plate pivotally mounted to the supporting member and connected to the rod. The rotation of the lock plates closes the hook in an engaged position or opens the hook in a disengaged position.

According to one aspect of the present invention, the retaining member is pivotally mounted to the vehicle and mechanically connected to a mechanical connection adapted to move the retaining member to release the first end.

According to one aspect of the present invention, the mechanical connection is engaged by a release controller. The release controller is located within arm's reach of the vehicle user when located in the driving position.

According to one aspect of the present invention a vehicle mounting assembly for mounting a support frame to a vehicle is disclosed. The mounting assembly comprises a mounting plate being configured to be mounted to an underside of the vehicle; a retaining element supported by the mounting plate, the retaining element being adapted to retain the support frame to the vehicle in a first position and to release the support frame in a second position; and an actuator operatively connected to retaining element to move the retaining element between the first and second position, the actuator being located on the vehicle in a location allowing a user to reach the actuator while the user is in the driving position. The actuator may be mechanically connected to the retaining element and the retaining element may either be a latch or a hook.

According to one aspect of the present invention, the self-detach support frame comprises a rear end configured to be removably mounted to the mounting plate and engaged by the retaining element, and a front end operatively mounted to an implement, the support frame comprising a rear section and a front section pivotally connected thereto.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 10 is a side perspective view of a self-detaching support frame system for an assembly.

DETAILED DESCRIPTION OF THE PREFERRED EMBODIMENT

A novel self-detaching support frame system for an implement and method for using the same will be described hereinafter. Although the invention is described in terms of specific illustrative embodiments, it is to be understood that the embodiments described herein are by way of example only and that the scope of the invention is not intended to be limited thereby.

Figure 1:
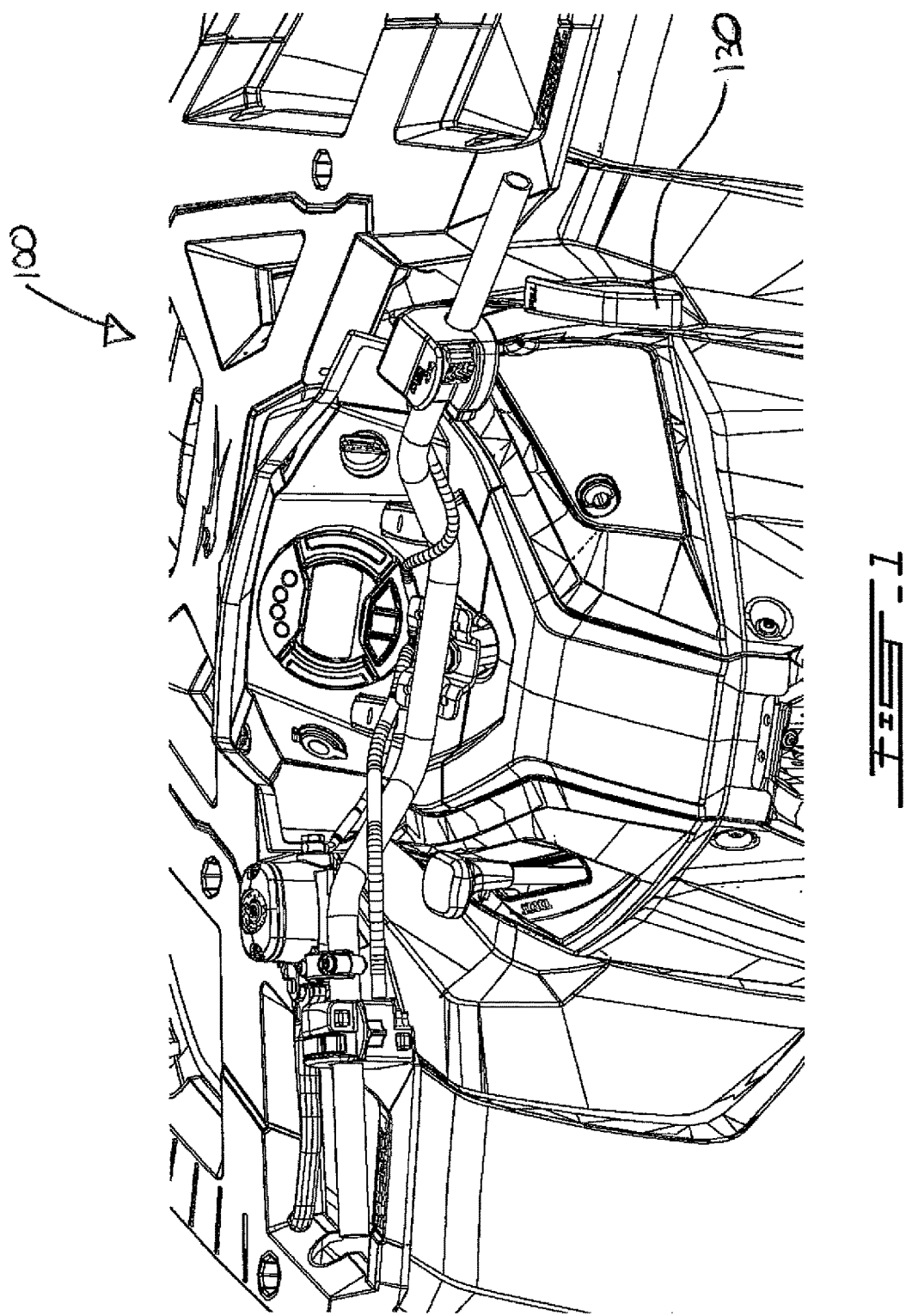
FIG. 1 is a user view of an ATV exposing a control for the self-detaching support frame system for an assembly
Figure 2:
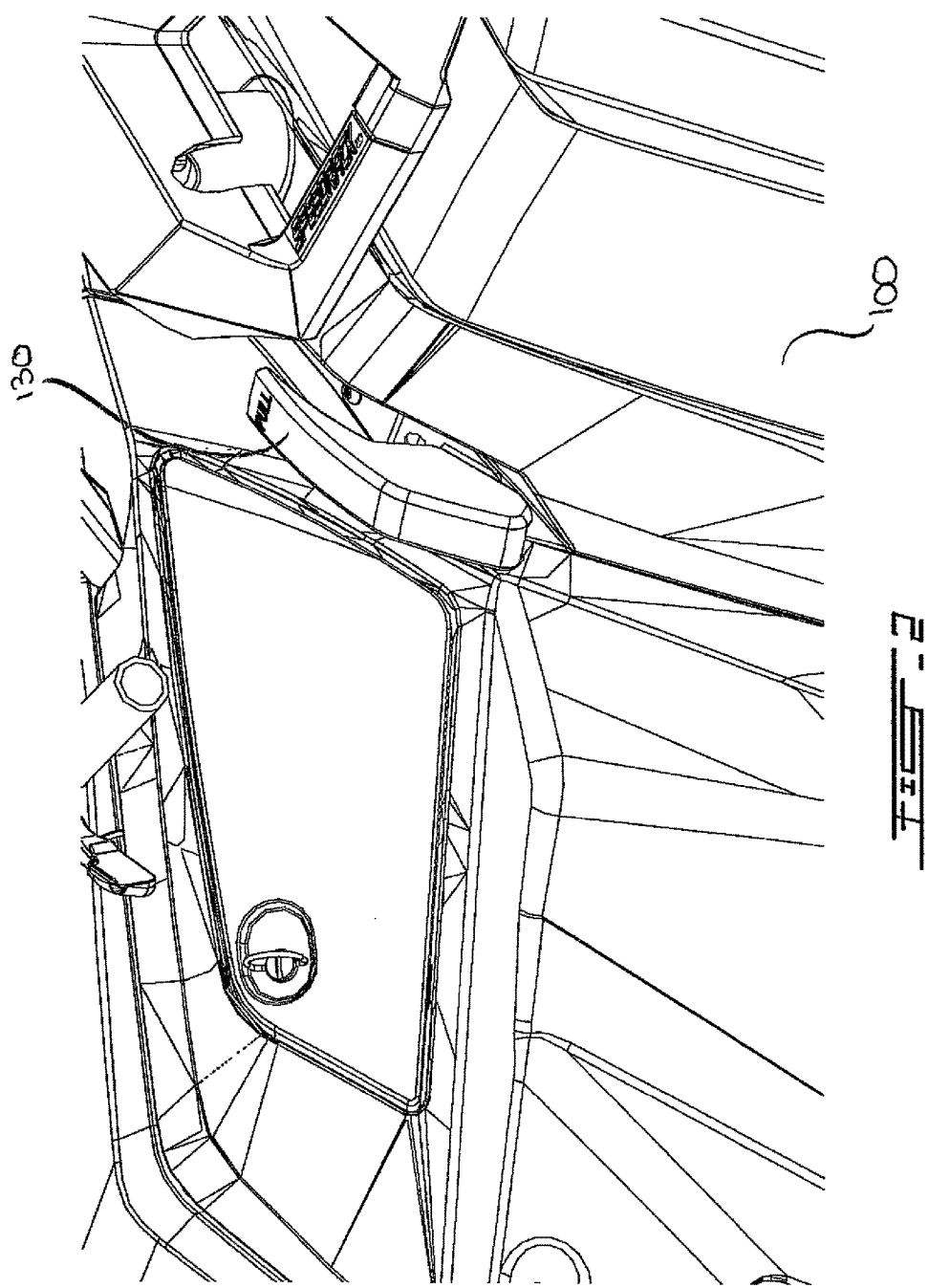
FIG. 2 is a close up view of the control of FIG. 1.

Referring first to FIGS. 1-6, an embodiment of a self-detaching support frame system for an implement 220, in accordance with the principles of the present invention, is depicted mounted to a vehicle 100. In FIG. 1, the vehicle 100 is an ATV. However, the vehicle 100 could be a UTV, ROV or any other similar small vehicles.

Now referring to FIGS. 1-6, in the present embodiment, the self-detaching support frame system for an implement 220 comprises a vehicle plate 120 mounted on the underside of the vehicle 100, a release control 130 in distance reach of the vehicle user, a mechanical connection 240 between the release control 130 and the vehicle plate 120 and a support frame structure for implement 300. The in distance reach release control 130, once disengaged, preferably renders the vehicle 100 ready to drive without the plow system and without the user having to get off the vehicle 100.

In the present embodiment, the self-detaching support frame system for an implement 220 comprises a support frame structure for implement 300 releasably mounted to a mounting rod 116 located on the front side 118 of the frame of the vehicle 100 and a releasable attachment mechanism 320 located on a vehicle plate mounted to the underside of the vehicle. The mounting rod 116 can be either mounted to the underside of the frame 112 or integral therewith.

The system preferably has a pull cable with a handle located near the vehicle 100 steering, which is connected to the vehicle plate latching system 170. As it will be best understood below, the connection between the support frame 300 and the frame 112 allows the implement 220 mounted to the support frame 300 to self-detach upon the actuation of a release control 130 by the user (see FIG. 2).

In other embodiments, the support frame 300 could be mounted to the underside of the vehicle 100 via different attachment mechanisms. However, these other attachment mechanisms must still allow the support frame 300 to pivot with respect to the frame 112 of the vehicle 100. One of such other attachment mechanism is the use of a clevis pin. The clevis pin in another embodiment preferably acts as the pivot from which the frame may pivot with regard to the frame of the vehicle. In such an embodiment where the self-detach mechanism is combined with a clevis pin, the mechanical connection between the release control and the release mechanism could be via the clevis pin. As such, upon actuation of the release control, the clevis pin or pins would be removed, thus releasing the support frame.

Support Frame

As seen generally in the figures and more particularly in FIGS. 6-10, the support frame 300 comprises the frame 340 and attachment means 315 for supporting the implement. The frame 340 generally extends longitudinally and comprises a front or forward end portion 342 and a rear or rearward end portion 344. In the present embodiment, the front portion 342 is substantially H-shaped and comprises two longitudinal members 350 and 352 reinforced by a middle support member 354. The front portion 342 comprises a first end 336 for mounting the implement 220 and a second end 338 pivotally connected to the rear portion 344. The front portion 342 further comprises a winch hook attachment system 370.

Figure 6:
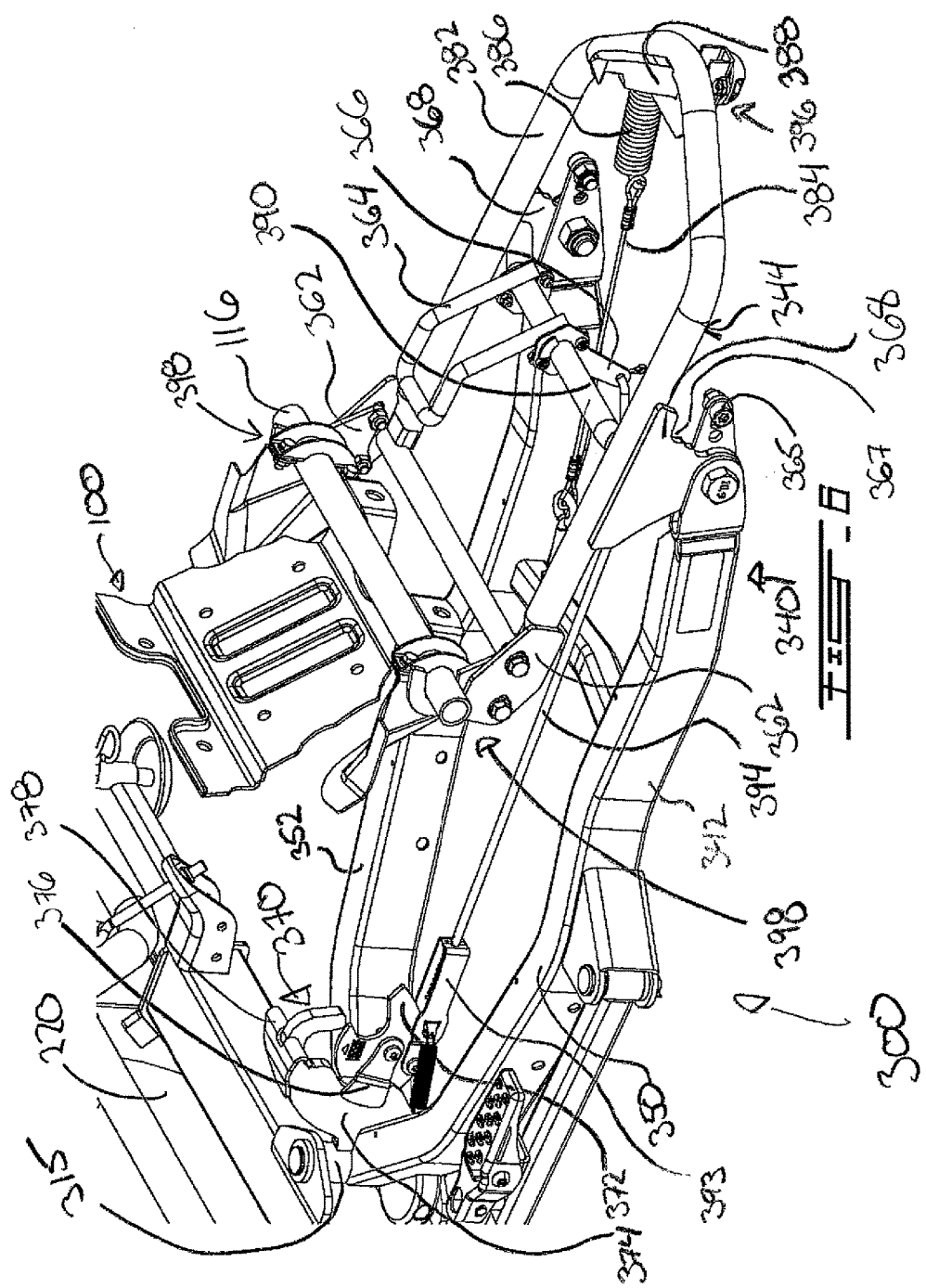
FIG. 6 is a perspective view of an ATV exposing the self-detaching mechanism of the self-detaching support frame system for an assembly partially mounted thereto.
Figure 7:
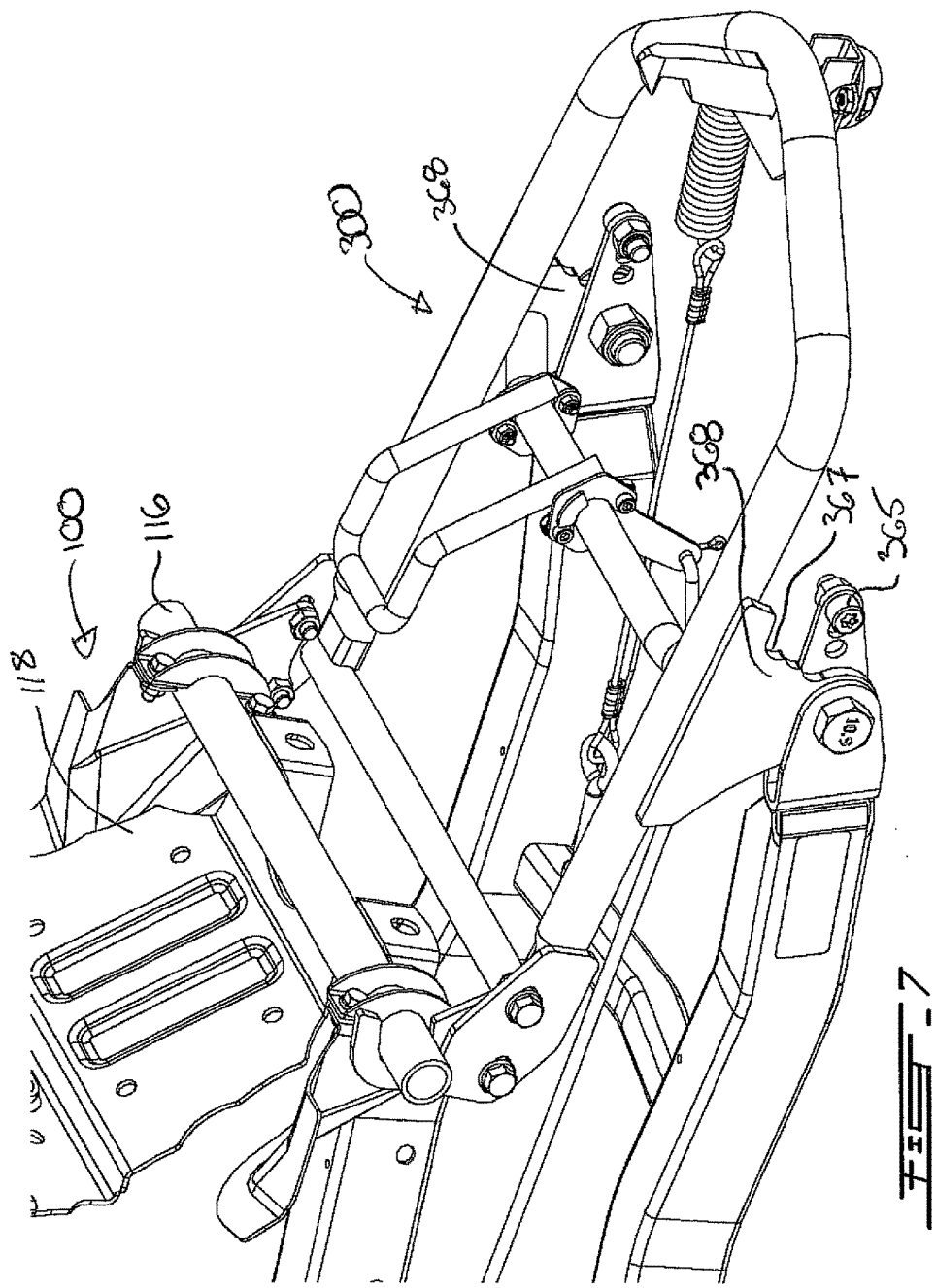
FIG. 7 is a close up view of the self-detaching mechanism of FIG. 6.
Figure 8:
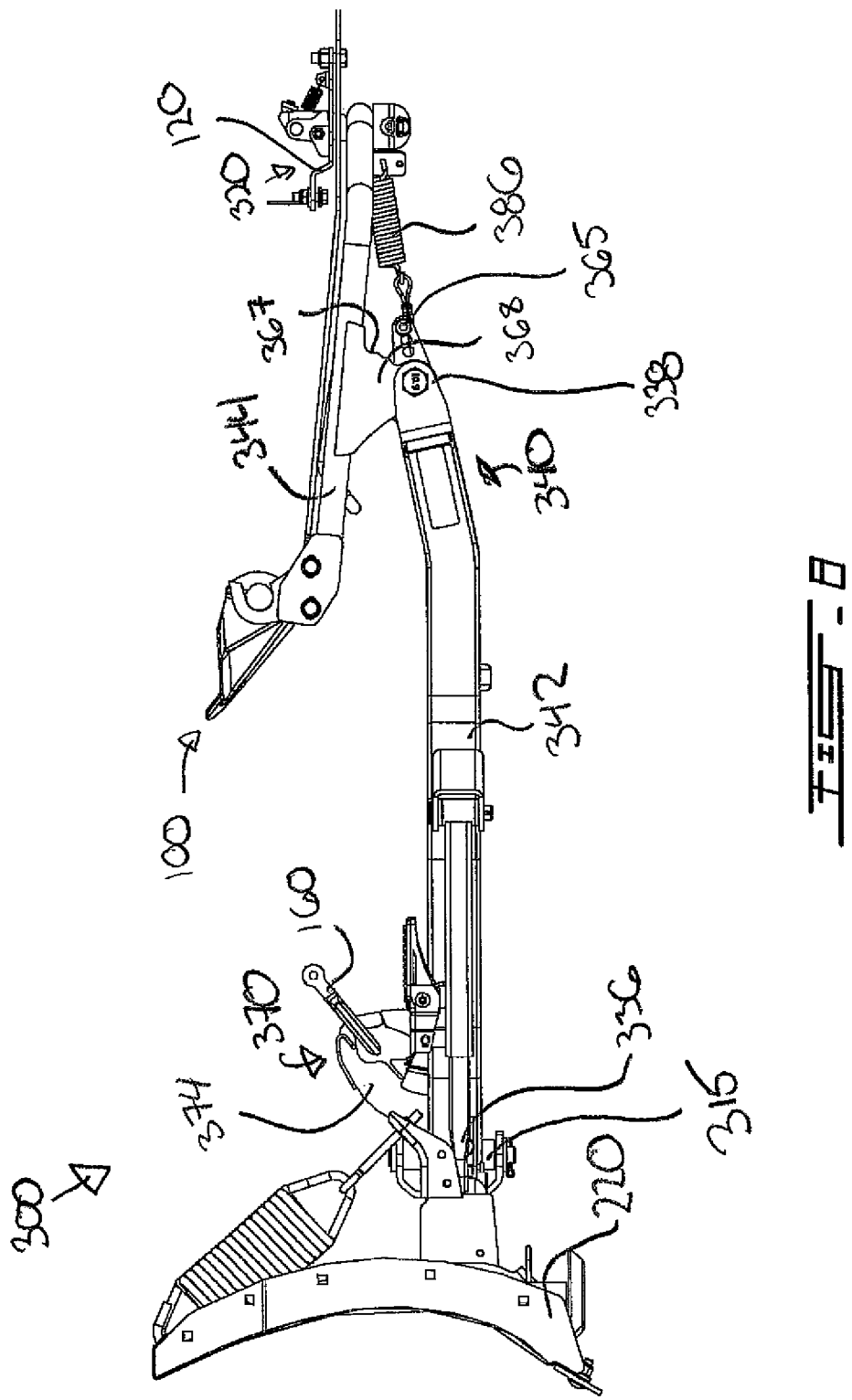
FIG. 8 is a side elevation view of a self-detaching support frame system for an assembly mounted to an ATV.
Figure 9:
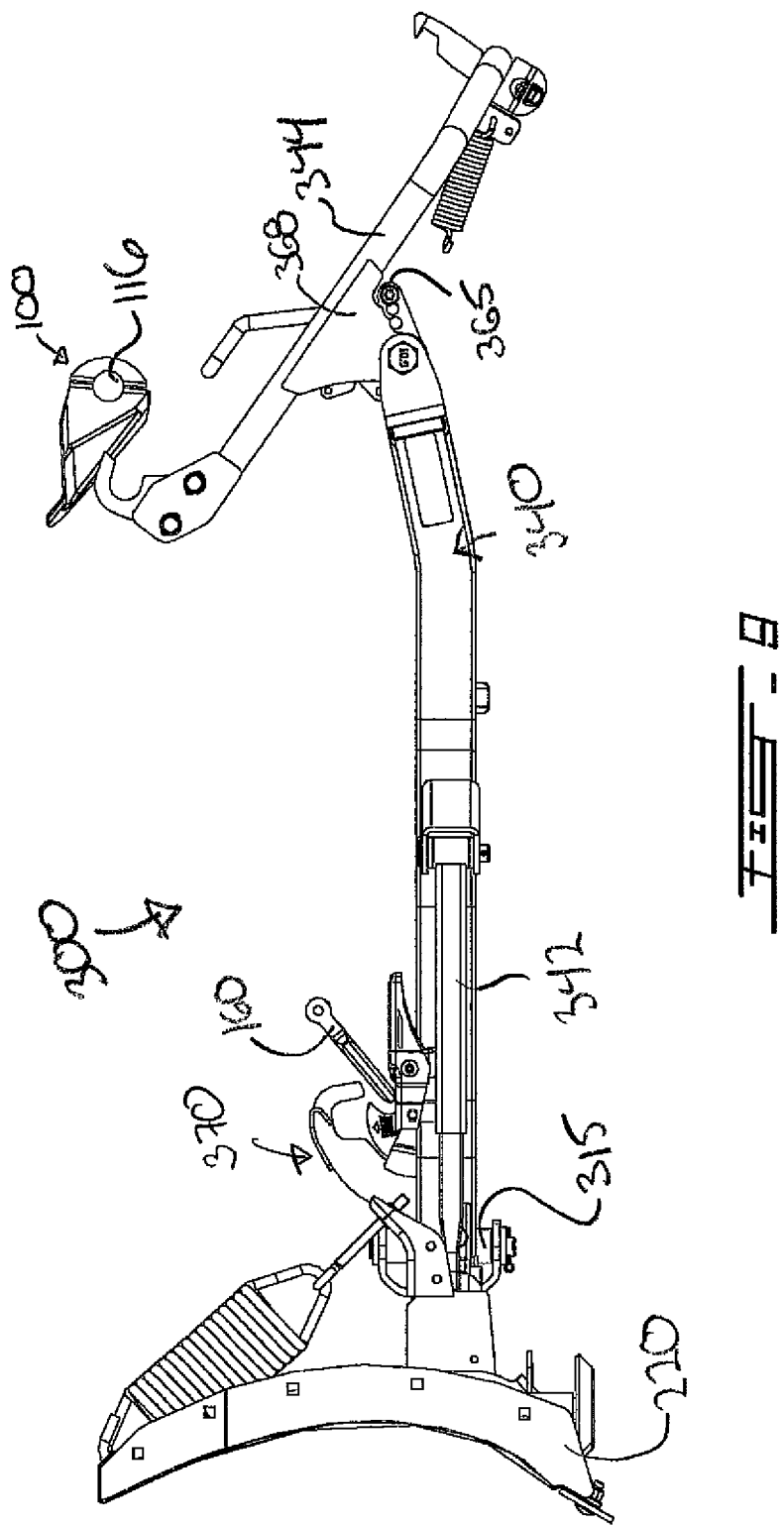
FIG. 9 is a side elevation view of a self-detaching support frame system for an assembly partially mounted to an ATV.

Referring to FIGS. 6-10 and particularly to FIG. 6, the forward end portion 342 of the support frame 300, and of the members 350 and 352, are hingedly connected to the rear end portion 344 as to permit the implement 220 to pivot with respect to the vehicle 100. The rear portion comprises front brackets 362 for mounting the support frame 300 to the vehicle 100, a D-shape body 382 comprising right and left side arms 368 for pivotally connecting the rear portion 344 to the front portion 342 and a rear latch hook 388 for securing the support frame 300 to the vehicle 100. The rear portion 344 further comprises a reinforcing arm 390 abutting on the right and left side arms 368. The reinforcing arm 390, also referred to as the middle arm 390 comprises a lever arm 364 mounted thereto. The lever arm 364 is used to pull the rod 394 actuating winch hook attachment system 370 in a closed position, securing the winch hook 160 to the support frame 300 upon mounting of the support frame 300 to the vehicle 100. The movement of the lever arm 364 is initiated when the lever arm 364 is pressed against the skid plate (not shown) of the vehicle 100 when mounting the support frame 300 to the vehicle 100. The middle arm 390 also comprises a finger 366 connected to an elongated member 394 operatively mounted to the winch hook attachment system 370 release mechanism.

Referring back to FIGS. 6-10, winch hook attachment system 370 comprises a winch cable supporting member 374 connected to and extending between the members 350 and 352. In the present embodiment, the winch cable supporting member 374 has a generally inverted 'U' shape and a rotated lock plate 372 adjacent thereto for retaining the winch hook 160. The winch cable (not shown) and winch hook 160 referred to herein are the winch and winch hook 160 of the vehicle 100. The rotated lock plate 372 is preferably operatively mounted to the winch cable supporting member 374 via a pair of supporting members 376. Although preferred, any other suitable means of releasably securing the winch hook to the winch hook attachment system 370 would be suitable provided the winch hook 160 is easily releasable. The rotated lock plate 372 is also operatively connected to a spring loaded end 393 of the elongated member 394 for interlinking the rear portion 344 and winch hook attachment system 370. Accordingly, though not shown, the position of the winch cable supporting member 374 could be adjustable in order to accommodate different configurations of winch positions and mounting plate positions.

As it will also be best understood below, having the rotated lock plate 372 adjacent to the winch cable supporting member 374 allows the retention of the winch hook 160 during use of the self-detaching support frame system for an implement 200. The rotated lock plate 372 also allows the release of the winch hook 160 upon actuation of the release control 130 which provides significant benefits such as making the self-detaching mechanism complete and not requiring the user to get off the vehicle 100 even after detaching off the support frame 300 from the vehicle plate 120.

According to one embodiment of the present invention, now referring to FIGS. 6-10 the right and left side arms 368 comprise indentations 367 for receiving the side walls of stoppers 365 installed on the front portion 342 of the support frame 300. The stoppers 365 may be installed at various positions to allow adjustment of the height of the front brackets 362 when the support frame 300 rests on the ground. The adjustment of the stoppers 365 thus modulates the height of the support frame 300 as a function of the height of the vehicle 100. As such, the stoppers 365 are positioned to ensure that the brackets 362 are at least as high as the front mounting rod 116 to ensure proper mounting of the support frame 300 to the vehicle 100.

Locking System

Figure 5:
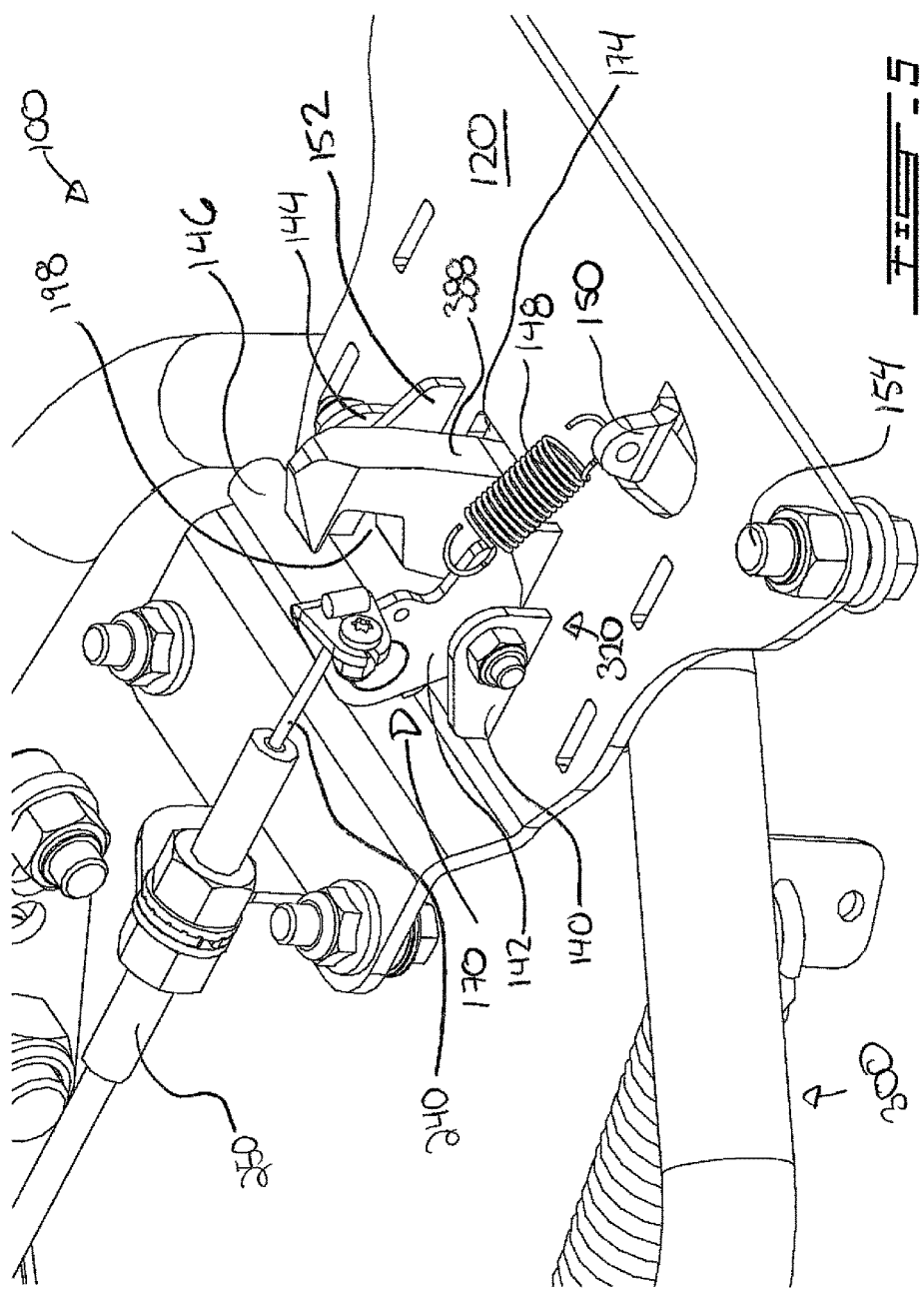
FIG. 5 is a close up view of the self-detaching mechanism of FIG. 3 upon actuation of the self-release control.

As seen generally in the figures and more particularly in FIGS. 5 and 6, the locking system comprises front and rear vehicle attachment 396, 398 and a locking mechanism 170. The rearward end portion 344 of the frame 300 comprises the rear vehicle attachment 396 configured to be releasably engaged to a mounting plate (also referred to as vehicle plate) 120 (see FIG. 5) secured to the underside of the vehicle 100.

In the present embodiment, the rear vehicle attachment 396 comprises a latch hook 388 operatively connected to the rearward end portion 344. The front vehicle attachment 398 comprises a pair of front hooks 362 which are respectively mounted to a matching rod 116 installed on the vehicle 100 or integrated in the frame of the vehicle 100. The locking mechanism 170, generally located on the mounting plate 120 comprises a spring-loaded retaining member 146 actively locking the latch hook 388. The spring loaded locking mechanism 170 comprises a retaining member 146 operatively biased in an operative position, a position in which the retaining member 146 would retain the latch hook 388 to secure the front and rear vehicle attachments 396, 398 of support frame 300 to the vehicle 100. In the present embodiment, the operational bias is applied to the retaining member 146 by a resilient member 148 operatively connected to the retaining member 146 and to the vehicle plate 120 via a plate support member 150.

The main use of the latch hook 388, in cooperation with the front hooks 362, is to securely attach the rear portion 344 of the support frame 300 to the mounting plate 120 connected to the vehicle 100, and more particularly to the front mounting rod 116 and spring loaded locking mechanism 170 also referred to as a latch mechanism 170 (see FIG. 5).

Vehicle Plate Latching System

Figure 3:
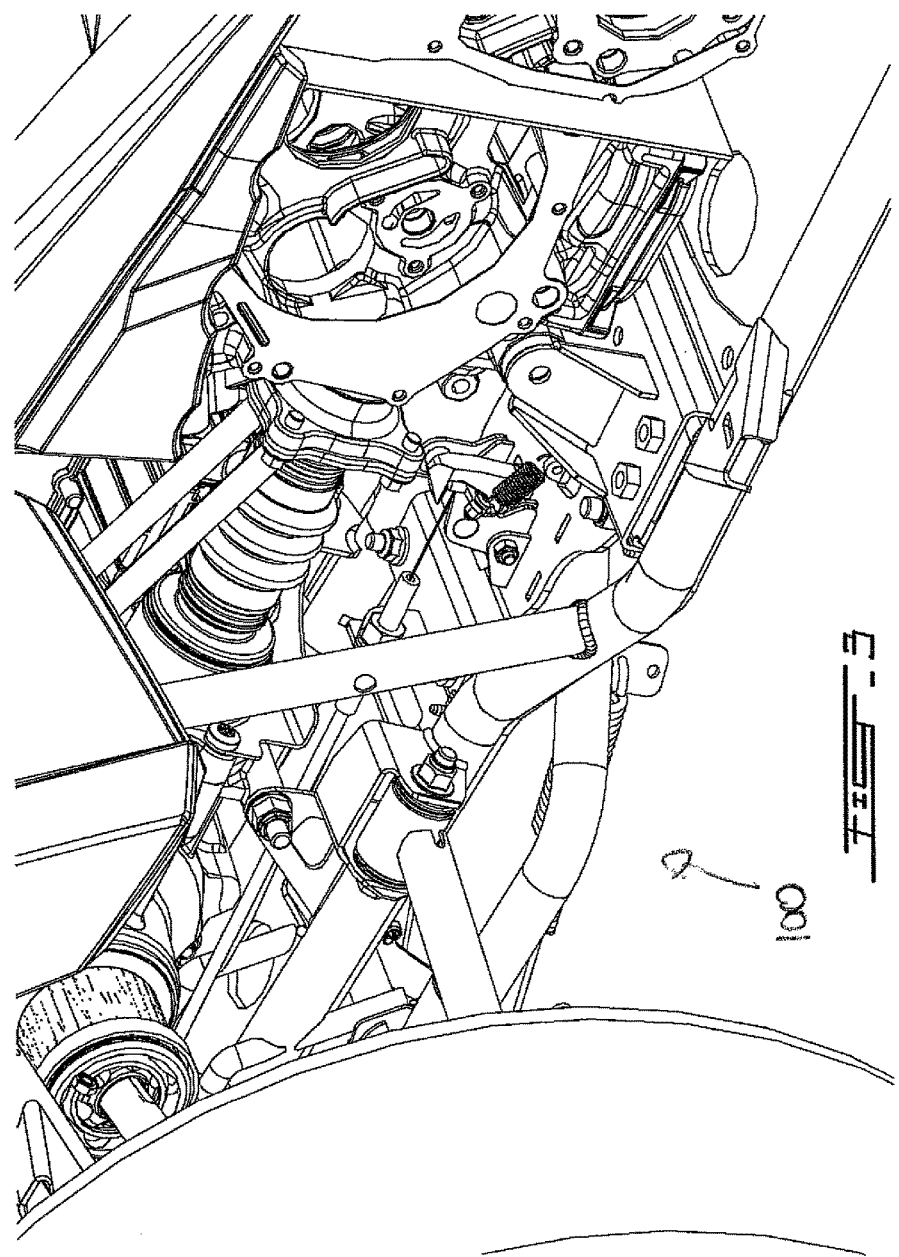
FIG. 3 is a side view of an ATV exposing the self-detaching mechanism of the self-detaching support frame system for an assembly mounted thereto.
Figure 4:
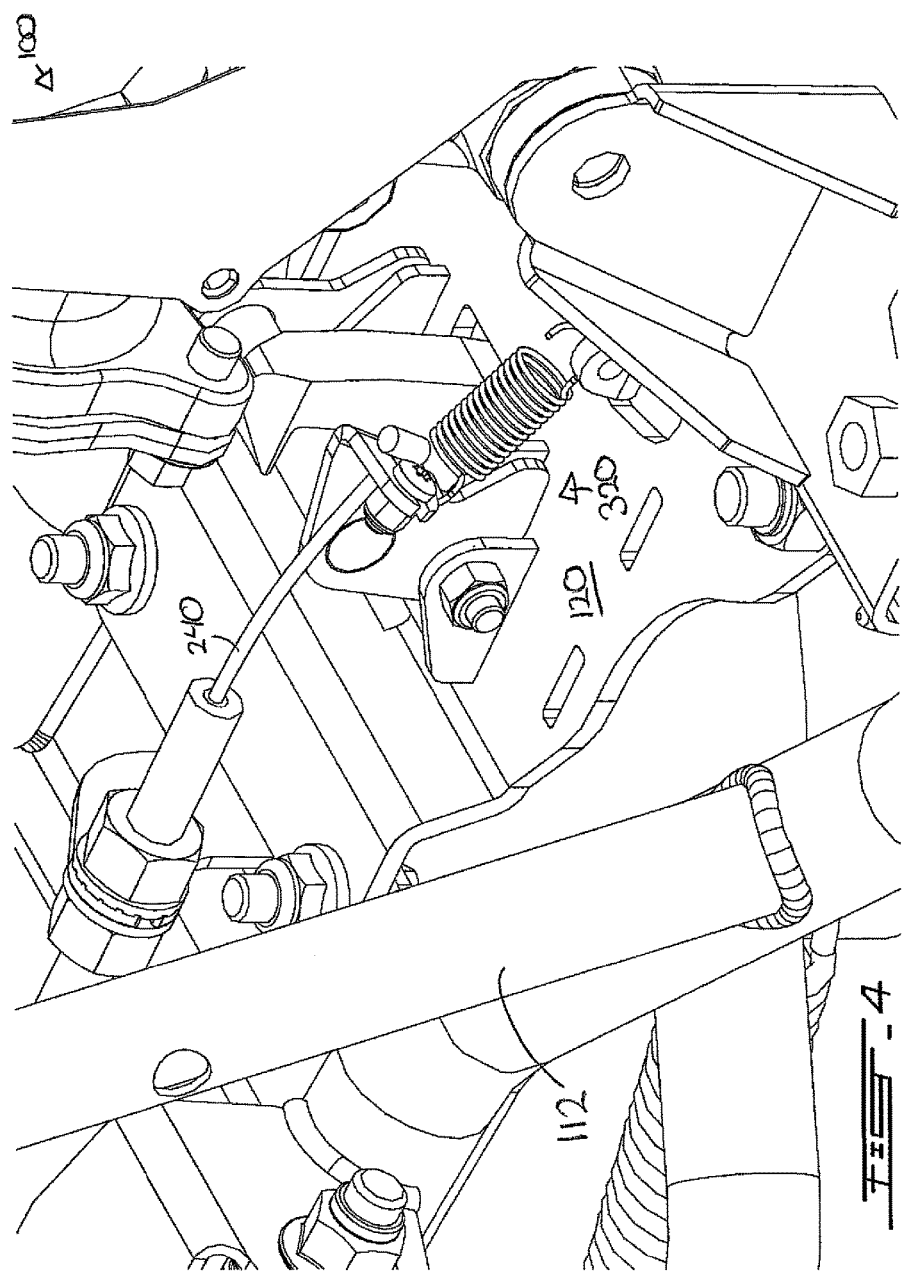
FIG. 4 is a close up view of the self-detaching mechanism of FIG. 3.

Referring now to FIGS. 3-5, in the present embodiment, the vehicle plate 120 comprises attachment means, typically apertures (not shown), for mounting the vehicle plate 120 to the vehicle 100. According to one embodiment, the vehicle plate could be fastened to the underside of the vehicle using fasteners 154. According to another embodiment, the vehicle plate could be integrated to the vehicle frame 112. The vehicle plate 120 generally comprises a latch mechanism 170 for receiving the latch hook 388 of the rear portion 344 of the support frame 300. The latch mechanism 170 comprises a retaining member 146 configured to insert in the latch hook 388 thus releasably securing the support frame 300 to the vehicle 100. The retaining member or rod 146 is controlled by a retention control 130. From the retaining member 146, a spring 148 extends which is preferably configured to maintain the retaining member 146 in a locked position. The retaining member 146 is preferably mounted on side support arms 142, 152 pivotally connected to attachment plates 140, 144 mounted to the vehicle plate 120. As such, the vehicle plate 120 comprises a plate opening 174 for receiving the latch hook 388. Understandably, the opening 174 is properly sized to receive the latch hook 388. The plate opening 174 is preferably larger than the latch hook 388 to allow for ease of securing the latch hook 388 to the retaining member 146. At least one of the side support arms 142, 152 is biased in the operative position by a resilient member, preferably a spring, 148 operatively mounted to the support plate, preferably via a plate support member 150. Understandably, any suitable biasing mechanism for biasing the retaining member 146 in its operative position, the position where the latch hook 388 is retained and where the support frame is mounted to the vehicle, would allow the latch mechanism 170 to retain the latch hook 388.

As best shown in FIGS. 3 and 4, the recess 198 cooperates with the similarly curved surface of the retaining member 146 of the vehicle plate 120 to form a secure attachment when in the locked position.

In accordance with the principles of the present invention, now referring to FIGS. 3-6, the rear vehicle attachment 396 work in cooperation with the balancing effect of the hooks 362 and front supporting rod 116. More particularly upon advancing of the vehicle 100, the vehicle skid plate (not shown) interacts with the lever arm 364 to actuate the winch hook attachment system 370 securing the winch hook 160 to the support frame 300. The vehicle front supporting rod 116 is then received in the support frame front hooks 362, which upon further advancement of the vehicle 100 directs the latch hook 388 in the opening 174 to engage the retaining member 146 and secure the support frame 300 to the vehicle 100.

Release Mechanism

In embodiment shown in FIGS. 4 and 5, the self-detaching support frame system for an implement 300 comprises a release control 130 for releasing the latch hook 388 from the vehicle plate 120. The release mechanism also referred as latch mechanism 170 releases the latch hook 388 by actuation of the release control 130 mechanically connected to the vehicle plate through a mechanical connection 240. The mechanical connection 240 pulls the retaining member 146 in its inoperative position, the position where the latch hook 388 is released or unrestrained by the retaining member 146. As such, the actuation of the release control rotates the lock system (the latch 170) and releases the hook 388 of the latching system 170. The latching mechanism holds to the mount plate by the hook 388 and by two brackets 362 (parts are attached on the ATV). By releasing the hook 388, the support frame 300 falls on the ground by gravity, then releasing the front brackets 362 in the same movement. The system is now completely disengaged. Once disengaged, the tube or lever arm 364 retained under the vehicle moves. As such, upon falling of the latch system on the ground, a lever arm 364 is released thus disengaging a rod 394 operatively connected to a rotated lock plate 372 previously engaging a winch hook 160. As such, movement of the rod 394 pull the rotated plate or pivot link 372 and eject the winch hook 160. As a result, the winch hook 160 is now completely disengaged. The system is totally free to be move and the vehicle ready to ride without the plow system 300.

Description of the Method

In the present embodiment, the method of mounting the plow system comprises the steps of: moving the vehicle forward while substantially aligned with the support frame 300, to engage the front brackets 362 with the mounting rod 116 located on the front side 118 of the frame of the vehicle 100, the vehicle moving forward until the latch hook 388 is securely mounted to the retaining member 146. The winch hook 160 is then manually attached to the hook receiving portion of the support frame 300.

Conversely, the method for self-detaching the self-detach support frame system for an implement comprises the step of:

a. pulling a handle on the vehicle to activate the release mechanism.

Understandably, prior to disengaging the support frame 300 from the vehicle 100, the implement 220 should be lowered and in contact with the ground thus releasing any tension in the winch cable (not shown).

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. A detachable support frame system attachable to a vehicle for mounting an implement thereto, the vehicle having a winch, the winch having a cable and a winch cable connector, a vehicle frame, a receiving member attached to the vehicle frame, a retaining member attached to the vehicle frame, the retaining member located rearward of the receiving member, the support frame system comprising:

a front frame portion extending along a longitudinal axis, the front frame portion including
a front leading portion including an implement connector connectable to the implement,
a front trailing portion including a front frame pivotable connector,
a winch cable connector retainer at least indirectly linked to the front frame portion and located forward from the front frame pivotable connector, the winch cable connector retainer including a receiving portion and a retaining portion, structured and arranged to removably receive the winch cable connector in the receiving portion when the winch cable connector retainer is in an open position, and to retain the winch cable connector when the winch cable connector retainer is in a closed position, the winch cable connector retainer biased into the open portion,
a rear frame portion including
a rear frame pivotable connector pivotably connected to the front frame pivotable connector and defining a frame pivot axis for pivoting the front frame portion with respect to the rear frame portion,
a lever pivotably connected to the rear frame portion via a lever pivot, the lever defining a vehicle arm and a winch cable connector retainer arm projecting outward from the lever pivot, the winch cable connector retainer arm connected to the winch cable connector retainer,
a rear leading portion extending forward from the rear frame pivotable connector and extending forward from the lever pivot, the rear leading portion including a receivable member, the receivable member detachably attachable to the receiving member,
a rear trailing portion extending rearward from the rear frame pivotable connector and extending rearward from the lever pivot, the rear trailing portion having a retainable member, the retainable member releasably attachable to the retaining member, and the support frame system being structured and arranged such that when the support frame system is attached to the vehicle, the receivable member is received by the receiving member, the retainable member is retained by the retaining member, the vehicle arm engages a portion of the vehicle frame, the vehicle arm and the winch cable connector retainer arm thereby being forced into an operative position with respect to the lever pivot, the winch cable connector retainer arm thereby forcing the winch cable connector retainer into a closed position.

2. A detachable support frame system attachable to a vehicle for mounting an implement thereto, the vehicle having a winch, the winch having a cable and a winch cable connector, a vehicle frame, a receiving member attached to the vehicle frame, a retaining member attached to the vehicle frame, the retaining member located rearward of the receiving member, the support frame system comprising:

a front frame portion extending along a longitudinal axis, the front frame portion including:
a front leading portion including an implement connector connectable to the implement,
a front trailing portion including a front frame pivotable connector,
a winch cable connector retainer at least indirectly linked to the front frame portion and located forward of the front frame pivotable connector, the winch cable connector retainer including a receiving portion and a retaining portion the winch cable connector retainer structured and arranged for removably receiving the winch cable connector in the receiving portion when the winch cable connector retainer is in an open position, and for retaining the winch cable connector when the winch cable connector retainer is in a closed position, the winch cable connector retainer biased into the open position,
a rear frame portion including:
a rear frame pivotable connector pivotably connected to the front frame pivotable connector for pivoting the front frame portion with respect to the rear frame portion,
a lever pivotably connected to the rear frame portion via a lever pivot, the lever defining a vehicle arm and a winch cable connector retainer arm projecting outward from the lever pivot, the winch cable connector retainer arm connected to the winch cable connector retainer,
a rear leading portion extending forward of the rear frame pivotable connector, the rear leading portion including a receivable member, the receivable member detachably attachable to the receiving member,
a rear trailing portion extending rearward of the rear leading portion, the rear trailing portion having a retainable member, the retainable member releasably attachable to the retaining member, and the support frame system being structured and arranged such that when the support frame system is attached to the vehicle, the receivable member is received by the receiving member, the retainable member is retained by the retaining member, the vehicle arm engages a portion of the vehicle, the vehicle arm and the winch cable connector retainer arm thereby being pivoted with respect to the lever pivot into an operative position, the winch cable connector retainer arm thereby forcing the winch cable connector retainer into a closed position.

3. A support frame system for releasably mounting an implement to a vehicle, the vehicle including
a mounting assembly for releasably attaching a structure to the vehicle, and being actuable to release the support structure, and a winch having a cable capable of being tensioned by actuation of the winch, the cable having a cable connector, the support frame system comprising:
an elongated support frame structured to be attachable to the implement, the elongated support frame including:
a front frame portion having a front mechanical connector structured to connect with the cable connector and to be actuated by a release linkage to disconnect the cable connector from the front mechanical connector,
a rear frame portion rearward of the front frame portion, the rear frame portion having a rear mechanical connector structured to detachably attach the rear frame portion to the mounting assembly; and
the release linkage, being
operatively connected to the front mechanical connector,
movably connected to the elongated support frame to be movable from an inoperative position in which the release linkage does not actuate disconnection of the cable connector from the front mechanical connector to an operative position in which the release linkage actuates disconnection of the cable connector from the front mechanical connector, and
biased toward the operative position and moving into the inoperative position when the rear frame portion attaches to the mounting assembly.

4. The support frame system of claim 3, wherein the support frame and the release linkage are structured and arranged with respect to the vehicle such that when
the vehicle is on a horizontal flat ground surface,
the elongated support frame is attached to the implement,
the implement is supported by the horizontal flat ground surface,
the front mechanical connector is connected to the cable connector, and
the cable is untensioned by the winch,
the release linkage moves into the inoperative position as the rear frame portion attaches to the mounting assembly; and
the release linkage moves into the operative position as the rear frame portion detaches from the mounting assembly.

5. The support frame system of claim 3, wherein the support frame and the release linkage are structured and arranged with respect to the vehicle such that when
the vehicle is on a horizontal flat ground surface,
the elongated support frame is attached to the implement, and
the implement is supported by the horizontal flat ground surface,
the release linkage is opposable against the vehicle to cause movement thereof into the inoperative position as the rear frame portion attaches to the mounting assembly.

6. The support frame system of claim 3, wherein the support frame and the release linkage are structured and arranged with respect to the vehicle such that when
the vehicle is on a horizontal flat ground surface,
the elongated support frame is attached to the implement,
the implement is supported by the horizontal flat ground surface, and
the rear frame portion detaches from the mounting assembly,
the release linkage moves away from the vehicle into the operative position.

7. The support frame system of claim 3, wherein the front mechanical connector includes a supporting member structured to removably receive the cable connector, the cable connector being received by the supporting member when the front mechanical connector is connected with the cable connector.

8. The support frame system of claim 7, wherein the front mechanical connector includes a releasing member structured to be movable between an open position and a closed position with respect to the supporting member, the release linkage being operatively connected to the releasing member so that, as the release linkage moves from the inoperative position to the operative position the releasing member is moved by the release linkage from the closed position to the open position.

9. The support frame system of claim 8, wherein the supporting member and the releasing member are structured and arranged with respect to one another such that when the cable connector is received by the supporting member and the cable is being tensioned, removal of the cable connector from the supporting member is prevented.

10. The support frame system of claim 8, wherein the supporting member and the releasing member are structured and arranged with respect to one another such that the front mechanical connector is connected with the cable connector when the cable connector is received by the supporting member and the releasing member is in the closed position.

11. The support frame system of claim 8, wherein the releasing member is structured such that when
the vehicle is on a horizontal flat ground surface,
the elongated support frame is attached to the implement,
the implement is supported by the horizontal flat ground surface,
the cable connector is received by the supporting member,
the releasing member is in the closed position, and
the cable is untensioned by the winch,
the releasing member is capable of removing the cable connector from the supporting member to disconnect the cable connector from the front mechanical connector.

12. The support frame system of claim 3, wherein the cable connector is a hook.

13. A support frame system for releasably mounting an implement to a vehicle, the vehicle including
a mounting assembly for releasably attaching a structure to the vehicle, and being actuable to release the support structure, and
a winch having a cable capable of being tensioned by actuation of the winch, the cable having a cable connector,
the support frame system comprising:
an elongated support frame structured to be attached to the implement, the elongated support frame having a rear frame portion and a front frame portion,
the rear frame portion having a rear mechanical connector structured to detachably attach the rear frame portion to the mounting assembly,
the front frame portion having a front mechanical connector structured to connect with the cable connector and to be actuated by a release linkage to disconnect the cable connector from the front mechanical connector, the front mechanical connector being located forward of the rear mechanical connector, and
the release linkage, the release linkage being cooperable with the vehicle and the front mechanical connector to disconnect the cable connector from the front mechanical connector concurrently with the rear frame portion detaching from the mounting assembly.

14. The support frame system of claim 13, wherein the cable connector is a hook.

15. The support frame system of claim 13, wherein
the release linkage is movable with respect to the front mechanical connector from an inoperative position to an operative position to actuate the front mechanical connector to detach the cable connector from the front mechanical connector;
the release linkage is biased toward the operative position; and
when
the vehicle is on a horizontal ground surface,
the elongated support frame is attached to the implement,
the implement is supported by the horizontal flat ground surface, and
the release linkage is pushed against the vehicle as the rear frame portion is being attached to the mounting assembly, the release linkage moves into the inoperative position; and
the release linkage is moved away from the vehicle as the rear frame portion is being detached from the mounting assembly, the release linkage moves into the operative position.

\* \* \* \* \*